United States Patent
Liu et al.

(10) Patent No.: US 7,755,059 B2
(45) Date of Patent: Jul. 13, 2010

(54) SYSTEMS, METHODS AND APPARATUS FOR REDUCTION OF FIELD-EFFECT TRANSISTOR LEAKAGE IN A DIGITAL X-RAY DETECTOR

(75) Inventors: James Zhengshe Liu, Glenview, IL (US); Ping Xue, Pewaukee, WI (US); Ching-Yeu Wei, Niskayuna, NY (US); Donald Langler, Brookfield, WI (US); Fengchao Zhang, Beijing (CN)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 12/264,461

(22) Filed: Nov. 4, 2008

(65) Prior Publication Data

US 2010/0108898 A1    May 6, 2010

(51) Int. Cl.
*G01T 1/24* (2006.01)
(52) U.S. Cl. .................................. 250/370.09
(58) Field of Classification Search ............ 250/370.01–370.15; 378/98.8
See application file for complete search history.

(56) References Cited

U.S. PATENT DOCUMENTS

| 5,708,840 | A | 1/1998 | Kikinis et al. | |
|---|---|---|---|---|
| 5,920,070 | A * | 7/1999 | Petrick et al. | 250/370.09 |
| 6,337,712 | B1 | 1/2002 | Shiota et al. | |
| 6,400,798 | B1 | 6/2002 | Leparmentier et al. | |
| 6,440,072 | B1 | 8/2002 | Schuman et al. | |
| 6,475,146 | B1 | 11/2002 | Frelburger et al. | |
| 6,833,867 | B1 | 12/2004 | Anderson | |
| 7,022,075 | B2 | 4/2006 | Grunwald et al. | |
| 2003/0078072 | A1 | 4/2003 | Serceki et al. | |
| 2004/0094720 | A1 * | 5/2004 | Dagan et al. | 250/370.12 |
| 2005/0136892 | A1 | 6/2005 | Oesterling et al. | |
| 2005/0197093 | A1 | 9/2005 | Wiklof et al. | |
| 2006/0070384 | A1 | 4/2006 | Ertel | |
| 2007/0004980 | A1 | 1/2007 | Warner et al. | |
| 2007/0180046 | A1 | 8/2007 | Cheung et al. | |
| 2007/0269010 | A1 | 11/2007 | Turner | |

OTHER PUBLICATIONS

Broadcom press release # 659800, "Broadcom, HP and Linksys Make Wi-Fi Installation as Easy as Pushing a Button," printed Dec. 16, 2005.
Broadcom press release #682849, "Broadcom makes Wi-Fi Phone Installation as Easy as Pushing a Button," printed Dec. 16, 2005.
U.S. Appl. No. 11,835,534, filed Feb. 10, 2009, Scott William Petrick.

* cited by examiner

*Primary Examiner*—David P Porta
*Assistant Examiner*—Kiho Kim
(74) *Attorney, Agent, or Firm*—Peter Vogel, Esq.; William Baxter, Esq.; Michael G. Smith, Esq.

(57) ABSTRACT

Systems, methods and apparatus are provided through which in some implementations field-effect-transistor (FET) leakage from a pixel array panel of a digital X-ray detector is reduced by acquiring an image and an offset image from the pixel array panel of the digital X-ray detector while a negative voltage of the pixel array panel is at a higher level than a negative voltage of a threshold state of the pixel array panel of the digital X-ray detector.

20 Claims, 6 Drawing Sheets

SYSTEMS, METHODS AND APPARATUS FOR REDUCTION OF FIELD-EFFECT TRANSISTOR LEAKAGE IN A DIGITAL X-RAY DETECTOR

FIELD OF THE INVENTION

This invention relates generally to medical diagnostic imaging systems, and more particularly to preventing leakage of field-effect transistors (FET) in medical imaging systems that employ solid state detectors.

BACKGROUND OF THE INVENTION

X-ray imaging has long been an accepted medical diagnostic tool. X-ray imaging systems are commonly used to capture, as examples, thoracic, cervical, spinal, cranial, and abdominal images that often include information necessary for a doctor to make an accurate diagnosis. X-ray imaging systems typically include an X-ray source and an X-ray sensor. When having a thoracic X-ray image taken, for example, a patient stands with his or her chest against the X-ray sensor as an X-ray technologist positions the X-ray sensor and the X-ray source at an appropriate height. X-rays produced by the source travel through the patient's chest, and the X-ray sensor then detects the X-ray energy generated by the source and attenuated to various degrees by different parts of the body. An associated control system obtains the detected X-ray energy from the X-ray sensor and prepares a corresponding diagnostic image on a display.

The X-ray sensor may be a conventional screen/film configuration, in which the screen converts the X-rays to light that exposes the film. The X-ray sensor may also be a solid state digital image detector. Digital detectors afford a significantly greater dynamic range than conventional screen/film configurations, typically as much as two to three times greater.

One implementation of a solid state digital X-ray detector may be comprised of an array of semiconductor field-effect transistors (FETs) and photodiodes. Each pair of photodiodes and FETs receive a pixel of photo data. All photodiodes on a column are connected to readout electronics with data lines through the FETs. A FET controller controls the order in which the FETs are turned on and off so that the photodiodes on a row are selected. When the FETs are turned on, a charge to establish the FET "conductive channel" is drawn into the photodiodes from the readout electronics. On top of the photodiodes, there is a layer of scintillation material (scintillator), such as cesium iodide (CsI) that is used to convert X-rays into visible light. The photodiodes are fully charged before an X-ray exposure and under ideal conditions, the parasitic capacitance of the photodiode retains the charge in the absence of light and X-ray exposure. During exposure, the photodiodes discharge. The amount of discharge is proportional to the X-ray dose received. After the X-ray exposure is complete, the diodes are charged again. The amount of charge restored to a diode is equal to that which was discharged by the exposure and is used by an acquisition system to modulate the intensity of the respective pixels in the displayed digital diagnostic image.

The FETs in the X-ray detector act as switches to control the charging of the photodiodes. When a FET is open (off), an associated photodiode is isolated from the readout electronics. When the FET is closed (on), the photodiode is recharged to an initial charge by the readout electronics. Light is emitted by the scintillator in response to received X-rays. The photodiodes sense the emitted light and are partially discharged. Thus, while the FETs are open (off), the photodiodes retain a charge which may be the initial charge, prior to the X-ray exposure, or less charge because the initial charge has been diminished by the light detected by the photodiode during exposure. When a FET is closed (on), a desired voltage across the photodiode is restored. The measured charge amount to re-establish the desired voltage becomes a measure of the X-ray dose integrated by the photodiode during the length of the X-ray exposure.

X-ray images may be used for many purposes. For instance, internal defects in a target object may be detected. Additionally, changes in internal structure or alignment may be determined. Furthermore, the image may show the presence or absence of objects in the target. The information gained from X-ray imaging has applications in many fields, including medicine, industrial inspection, and security.

A FET that operates with ideal results operates as a switch with the state of "open/close" and "off/on." In practicality, however, the perfect FET does not exist. There will be always some amount of leakage when a FET is in the state of "open/off." FET leakage occurs because the FET does not turn off completely when Voff is applied and there is still a small amount of current flowing from the diode onto the data line. FET leakage generates a variety of image artifacts.

BRIEF DESCRIPTION OF THE INVENTION

The above-mentioned shortcomings, disadvantages and problems are addressed herein, which will be understood by reading and studying the following specification.

In one implementation, a computer-accessible medium having executable instructions capable of directing a processor to bias a plurality of field-effect-transistors in a pixel array panel with a first negative voltage, bias the plurality of field-effect-transistors in the pixel array panel with a second negative voltage, the second negative voltage being higher than the first negative voltage, perform image acquisition through the pixel array panel with normal FET "off/on" and then bias the plurality of field-effect-transistors in the pixel array panel with the first negative voltage.

In another implementation, a method includes increasing a negative voltage to a pixel array panel, performing image acquisition through the pixel array panel with normal FET "off/on" and reducing the negative voltage to the pixel array panel.

In yet another implementation, a system to reduce field-effect-transistor leakage in a digital X-ray detector includes a processor, a digital X-ray detector coupled to the processor, and software apparatus operable on the processor to set a negative voltage of the digital X-ray detector to a negative voltage that is higher than a threshold negative voltage, acquire an image through the digital X-ray detector with normal FET "off/on", acquire an offset image through the digital X-ray detector with normal FET "off/on", and set a negative voltage of the digital X-ray detector to the threshold negative voltage.

In still another implementation, a solid state detector for use in detecting electromagnetic energy, the solid state detector includes a substrate, a panel array of field-effect transistors and photodiodes arranged in a plurality of rows positioned above the substrate, a scintillator positioned above the panel array of field-effect transistors and photodiodes, readout electronics coupled to each of the field effect transistors in the panel array, at least one digital output coupled to the readout electronics and apparatus operable to bias a negative voltage of the panel array to a negative voltage that is higher than a threshold negative voltage and acquire an image through the panel array with normal FET "off/on".

Systems, clients, servers, methods, and computer-readable media of varying scope are described herein. In addition to the implementations and advantages described in this summary, further implementations and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into four sections. In the first section, a system level overview is described. In the second section, methods are described. In the third section, particular implementations are described. Finally, in the fourth section, a conclusion of the detailed description is provided.

System Level Overview

Figure 1:
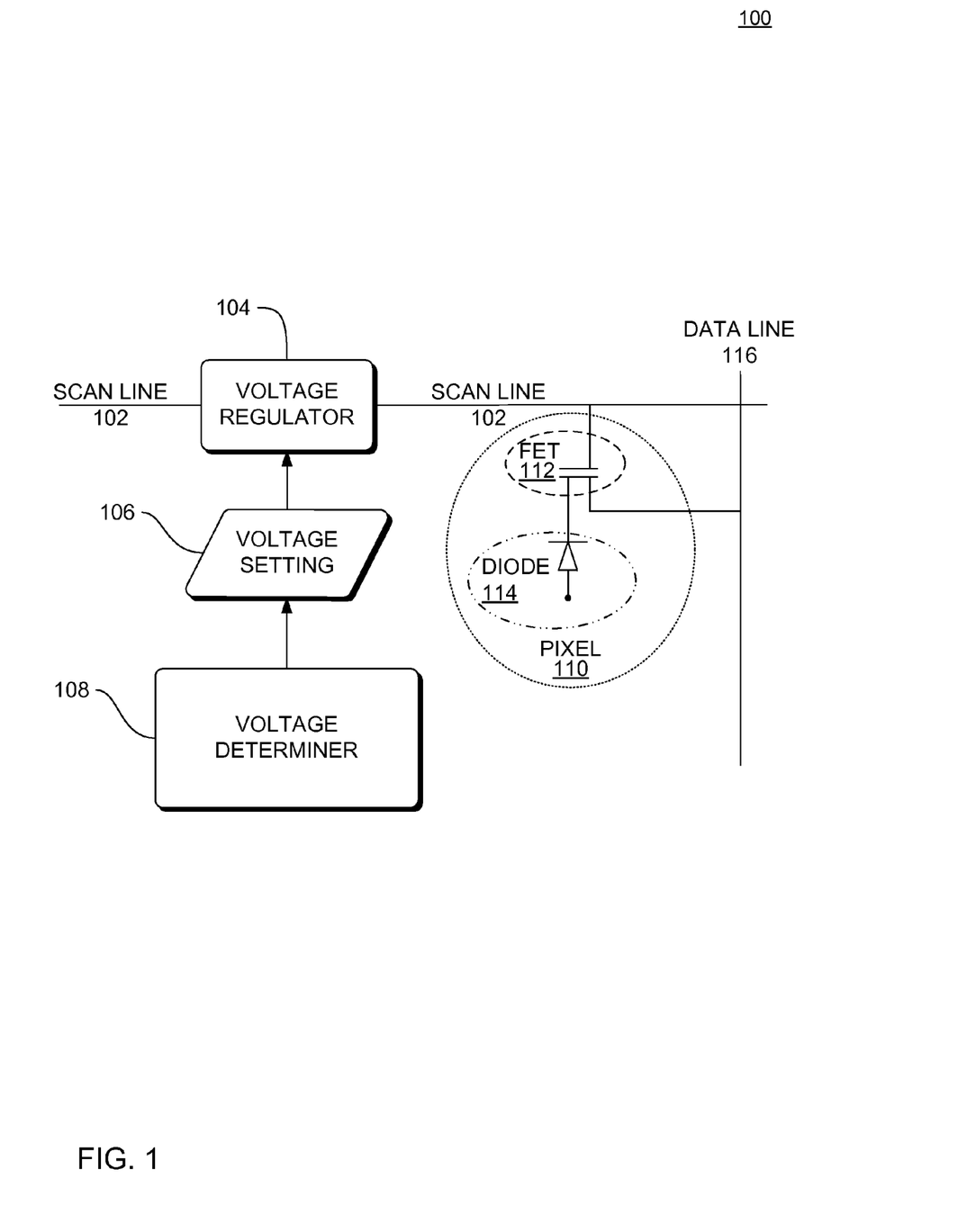
FIG. 1 is a block diagram of an overview of a system that manages negative voltages to a photodiode/field-effect-transistor (FET) pixel, according to an implementation.

FIG. 1 is a block diagram of an overview of a system 100 that manages negative voltages to a photodiode/field-effect-transistor pixel, according to an implementation. A system level overview of the operation of an implementation is described in this section of the detailed description. System 100 reduces or prevents FET leakage in a photodiode-based pixel.

System 100 includes a scan line 102. A voltage regulator 104 regulates voltage to the scan line 102. The voltage regulator 104 receives a data value or signal representing a voltage setting 106. Examples of the voltage setting 106 include a range of about −10 volts to about −12 volts, and in particular −11V; and a range of about −14 volts to about −16 volts, and in particular −15V. Negative voltages (i.e. −V) are notated as $V_{off}$ and positive voltages (e.g. +V) are notated as $V_{on}$. Electronic voltage regulators 104 operate by comparing the actual output voltage to the voltage setting 106 or other internal fixed reference voltage. Any difference is amplified and used to control a regulation element (not shown) within the voltage regulator 104. The amplified difference forms a negative feedback control loop. If the output voltage is too low, the regulation element is commanded to produce a higher voltage. In some implementations of the voltage regulator 104, if the output voltage is too high, the regulation element is commanded to produce a lower voltage; however, in some implementations, the voltage regulator 104 merely stops sourcing current to the scan line 102 and the voltage regulator 104 depends on the current draw of the scan line 102 to pull the voltage back down. By pulling voltage down based on the current draw of the scan line 102, the output voltage is held roughly constant at the voltage setting 106. Examples of the voltage regulator 104 include a shunt regulator such as a zener diode, avalanche breakdown diode, or voltage regulator tube or an active regulator such as linear regulators, switching regulators and silicon controlled rectifiers (SCR) regulators, and hybrids thereof.

A voltage determiner 108 generates the voltage setting 106 and a timing of when the voltage setting 106 is transmitted to the voltage regulator 104.

A pixel 110 includes a field-effect transistor (FET) 112 and a photodiode 114. When the FET 112 is activated, the photodiode 114 is connected to a data line 116 if $V_{on}$ is applied on the scan line 102. When $V_{off}$ is applied on the scan line 102, the FET 112 turns off, and the photodiode 114 is disconnected from the data line 116. An X-ray detector such as X-ray detector 600 in FIG. 6 includes a two-dimensional pixel array that converts X-ray energy into an image.

The FET 112 includes a gate, drain, and source terminal that are similar to the base, collector, and emitter of bipolar (unction) transistors (BJT). The gate terminal controls the opening and closing of the gate. The gate permits electrons to flow through or blocks their passage by creating or eliminating a channel between the source and drain. The FET 112 controls a flow of electrons (or electron holes) from the source to drain by affecting the size and shape of the "conductive channel" that is created and influenced by voltage (or lack of voltage) as applied across the gate and source terminals, when the body and source are connected. This conductive channel is the "stream" through which electrons flow from source to drain. If drain-to-source voltage is increased, this creates a significant asymmetrical change in the shape of the channel due to a gradient of voltage potential from source to drain. The shape of the inversion region becomes "pinched-off" near the drain end of the conductive channel. If drain-to-source voltage is increased further, the pinch-off point of the conductive channel begins to move away from the drain towards the source. By applying a higher negative voltage to the FET 112 during image acquisition, the conductive channel will be closed more completely or nearly completely so that less leakage will be generated. An important aspect is to not apply this higher negative voltage for extended periods of time, otherwise the higher negative voltage will lose the effect of reduced leakage. Instead, the higher negative voltage is applied to the FET 112 only at particularly important moments of activity of the pixel, such as image acquisition which usually lasts approximately 5 seconds. Applying higher negative voltage only during particularly important moments of activity of the pixel helps maintain effectivity of the higher negative voltage on the FET 112 when the reduced leakage FET leakage is most beneficial.

The voltage determiner 108 generates a voltage setting 106 to set $V_{off}$ of the scan line 102 to a threshold state, such as a range of about −10 volts to about −12 volts, and in particular −11V, or to an active image-acquisition voltage state, such as the range of about −14 volts to about −16 volts, and in particular −15V. Both medium and differential FET leakages decrease as $V_{off}$ to the scan line 102 increases in the negative direction. Thus, the impact of FET leakage is reduced or eliminated by using proper $V_{off}$ settings. In particular, setting negative voltage of the scan line 102 to a higher level before image acquisition by the pixel 110 greatly reduces, if not completely eliminates, FET leakage.

Method Implementations

Figure 2:
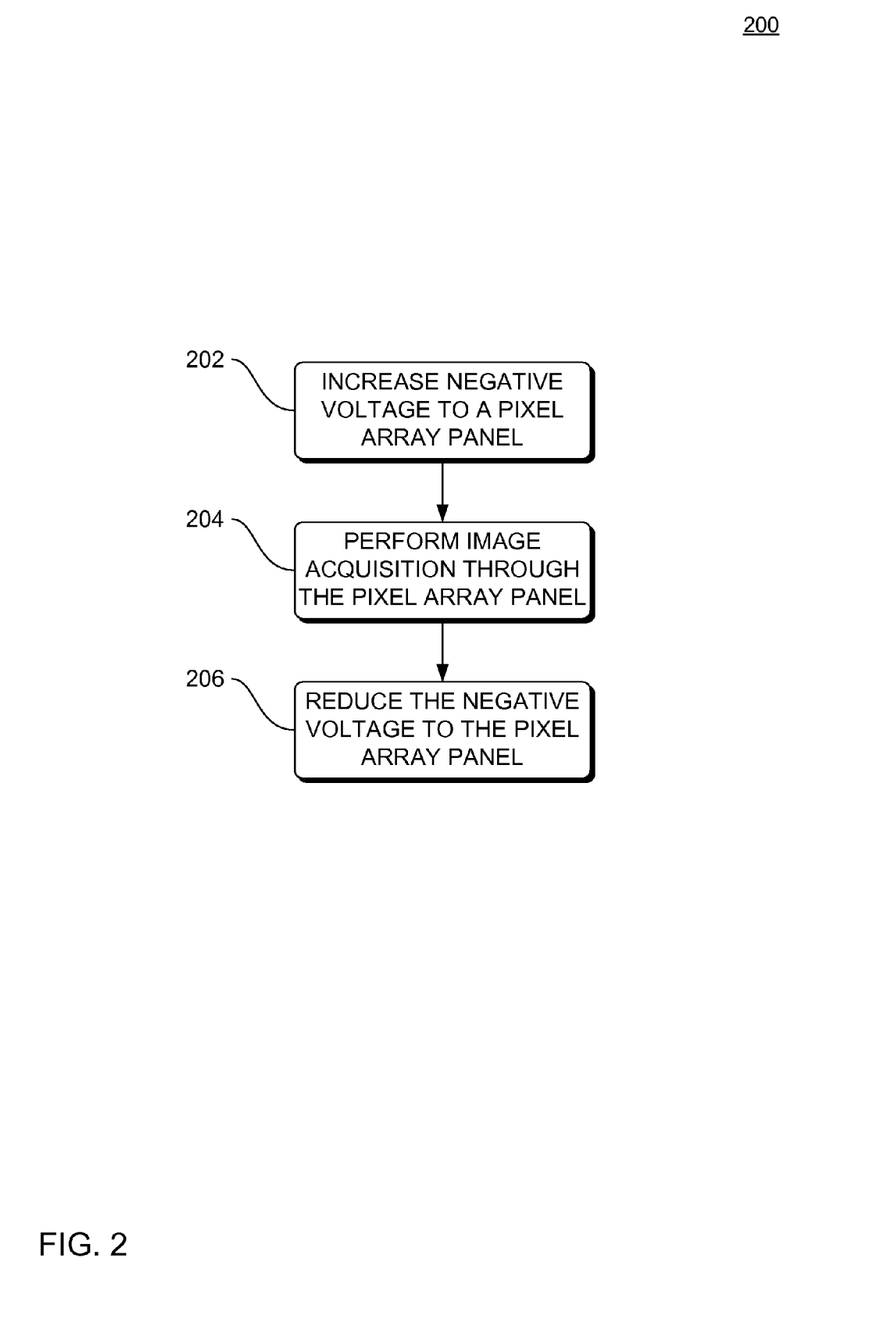
FIG. 2 is a flowchart of a method to prevent FET leakage in a solid state detector, according to an implementation.
Figure 3:
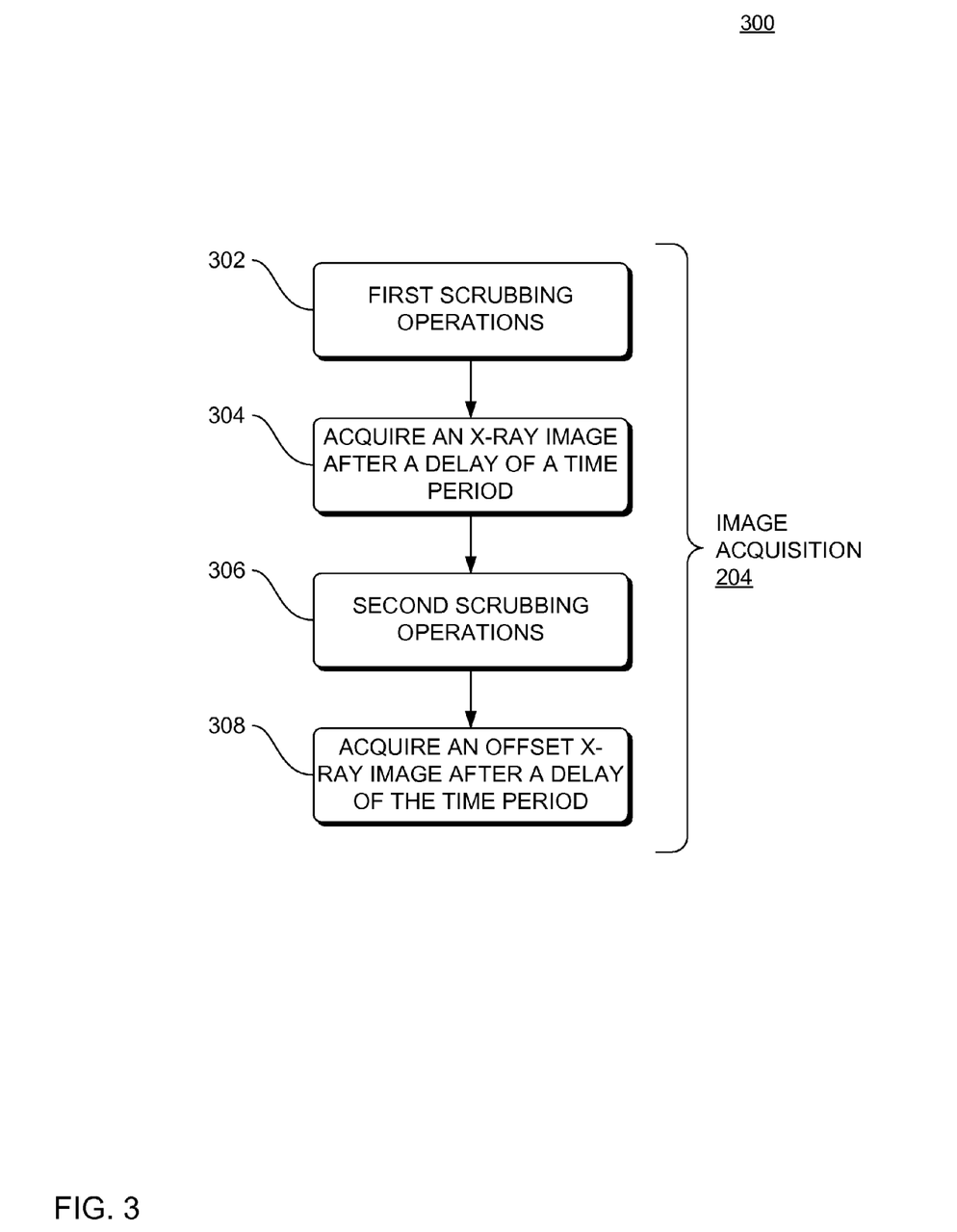
FIG. 3 is a flowchart of a method of image acquisition by a solid state detector, according to an implementation.
Figure 4:
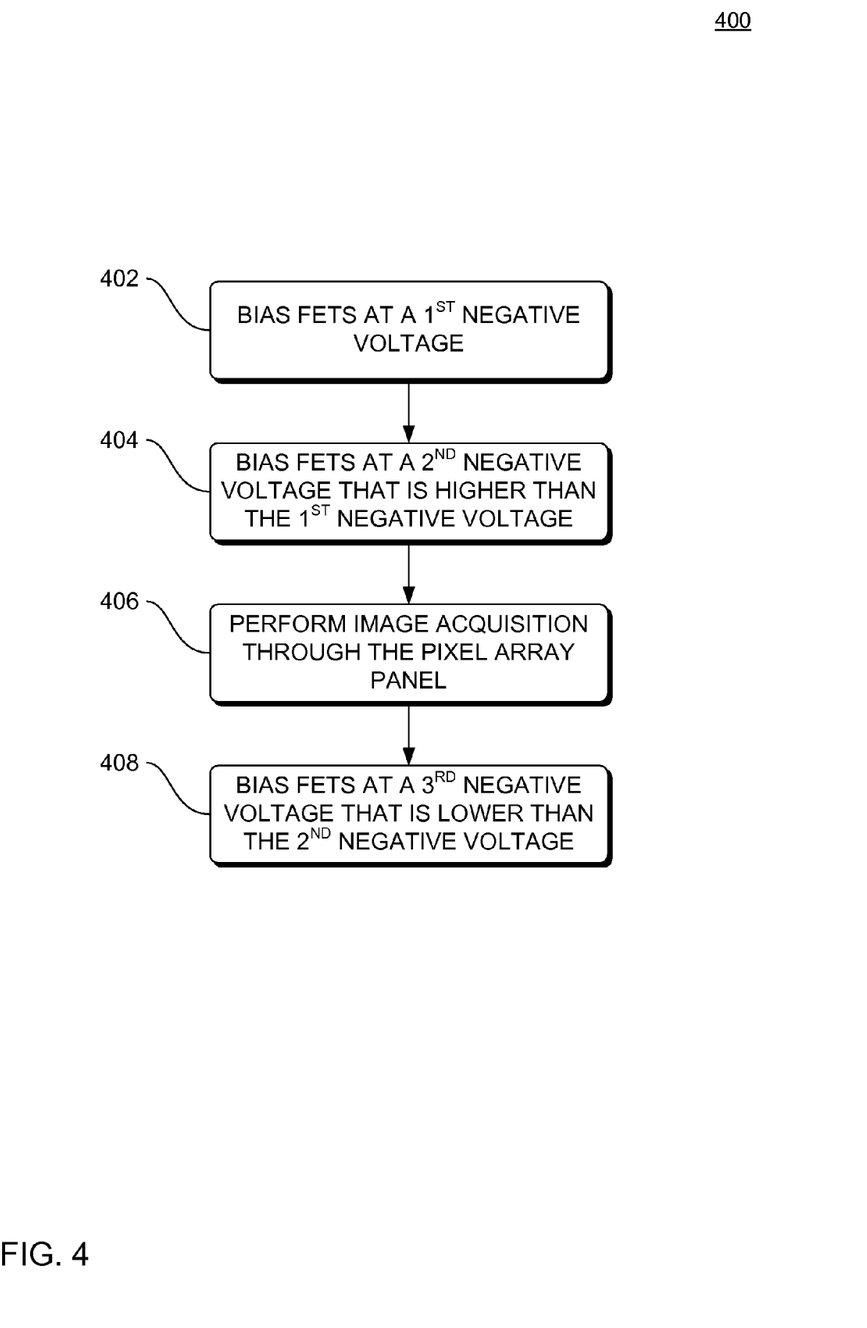
FIG. 4 is a flowchart of a method to prevent FET leakage in a solid state detector, according to an implementation.

In the previous section, a system level overview of the operation of an implementation is described. In this section, the particular implementations of methods (200, 300 and 400) are described by reference to a series of flowcharts (FIG. 2, FIG. 3 and FIG. 4). Describing the methods by reference to a flowchart enables one skilled in the art to develop such programs, firmware, or hardware, including such instructions to carry out the methods on suitable processors, executing the instructions from computer-readable media. Similarly, the methods performed by computer programs, firmware, or hardware are also composed of computer-executable instructions. In some implementations, methods 200, 300 and 400 are performed by a program executing on, or performed by firmware or hardware that is a part of, a solid state detector, such as a digital X-ray detector. In some implementations, methods 200, 300 and 400 are performed by a program executing on, or performed by firmware or hardware that is a part of, an X-ray detector. In other implementations, methods 200, 300 and 400 are performed by hardware that is separate from an X-ray detector. Method 200, 300 and 400 can be implemented by any electromagnetic energy detector, including an X-ray detector and a light detector.

FIG. 2 is a flowchart of a method 200 to prevent FET leakage in a solid state detector, according to an implementation. Method 200 can be performed by a digital X-ray detector, in which case, the digital X-ray detector prevents FET leakage in real-time.

Figure 6:
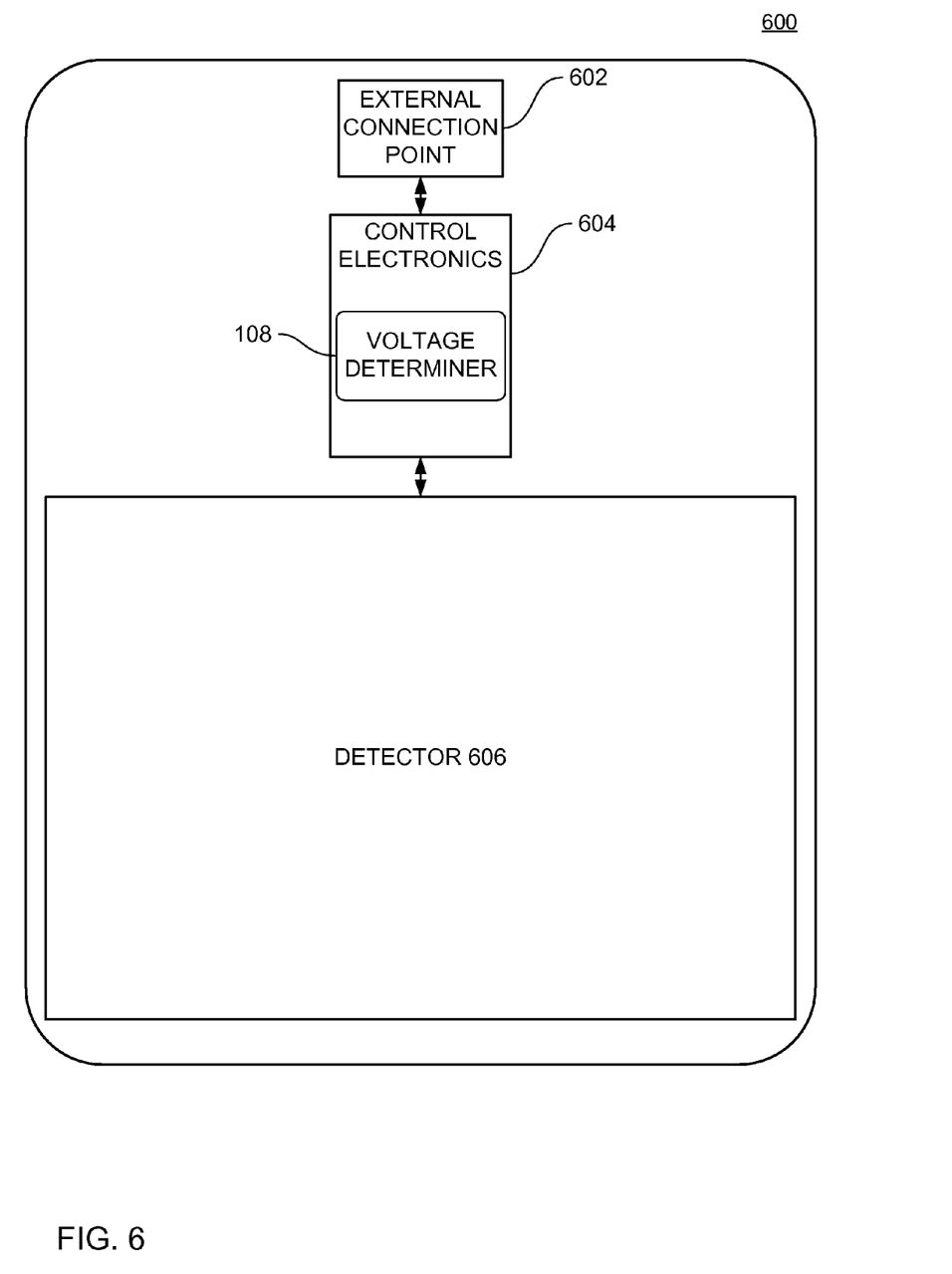
FIG. 6 is a block diagram of a portable X-ray detector having a voltage determiner that greatly reduces FET leakage, according to an implementation.

Method 200 includes increasing a negative voltage ($V_{off}$) to a pixel array panel, at block 202. At block 202, the amount of $V_{off}$ that is transmitted to the pixel array is greater in comparison to the amount of $V_{off}$ at a threshold state of the pixel array panel. For example, in some implementations the $V_{off}$ is adjusted by a range of between −2V to about 6V, an in particular about 4V from a threshold state level in a range of about −10 volts to about −12 volts, and in particular −11V that used during a threshold state of the X-ray detector to a level of about a range of about −14 volts to about −16 volts, and in particular −15V that is used during image-acquisition. Setting $V_{off}$ to the range of about −14 volts to about −16 volts, and in particular −15V during image acquisition is generally sufficient to greatly reduce or completely eliminate FET leakage in the pixel array panel. As described in FIG. 1, the increased $V_{off}$ is transmitted to a scan line of the pixel array panel of the X-ray detector. One example of a portable X-ray detector is shown in FIG. 6.

Method 200 also includes performing image acquisition through the pixel array panel, at block 204. In some implementations, the image acquisition is performed in response to an increased level of $V_{off}$ on one of the scan lines of the pixel array and the image acquisition is performed shortly after increasing the $V_{off}$.

Method 200 includes decreasing a negative voltage $V_{off}$ to a pixel array panel, at block 206. At block 206, the amount of $V_{off}$ that is transmitted to the pixel array is less in comparison to the amount of $V_{off}$ at an active state of the pixel array panel. For example, in some implementations the $V_{off}$ is decreased by about 4V from an active state level of about −15V that is used during image acquisition by the X-ray detector to a level in the range of about −10 volts to about −12 volts, and in particular −11V that is used during a threshold state of the pixel array panel. Setting $V_{off}$ within the range of about −10 volts to about −12 volts, and in particular −11V, after image acquisition is generally sufficient to stabilize state of FET off. As described in FIG. 1, the decreased $V_{off}$ is transmitted to a scan line of the pixel array panel of the X-ray detector. In some implementations, block 206 is performed shortly or immediately after block 204 in order to minimize instability in the FETs of the pixel array.

FIG. 3 is a flowchart of a method 300 of image acquisition by a solid state detector, according to an implementation. Method 300 is one example of image acquisition 204 in method 200 in FIG. 2.

Method 300 includes performing a first plurality of electronic scrubbing operations on the pixel array panel, at block 302. Method 300 also includes acquiring an X-ray image after a delay of a time period, at block 304.

Method 300 also includes performing a second plurality of electronic scrubbing operations on the pixel array panel, at block 306. Method 300 also includes acquiring an offset X-ray image after a delay of the time period, at block 308.

FIG. 4 is a flowchart of a method 400 to prevent FET leakage in a solid state detector, according to an implementation. Method 400 can be performed by a digital X-ray detector, in which case, the digital X-ray detector prevents FET leakage in real-time.

Method 400 also includes biasing FETs in a pixel array panel with a first negative voltage, at block 402. For example, the $V_{off}$ of the FETs are biased to a range of about −10 volts to about −12 volts, and in particular, −11V.

Method 400 also includes biasing the plurality of field-effect-transistors in the pixel array panel with a second negative voltage, the second negative voltage being higher (i.e. more negative) than the first negative voltage, at block 404. At block 404, $V_{off}$ of the pixel array biased at a second voltage level that is greater in comparison to the $V_{off}$ bias at the first negative voltage level. For example, in some implementations the $V_{off}$ is biased about 4V higher than a threshold state level of the range of about −10 volts to about −12 volts, and in particular, −11V that used during a threshold state of the X-ray detector to a bias of a range of about −14 volts to about −16 volts, and in particular −15V that is used during image-acquisition. Biasing $V_{off}$ to the range of about −14 volts to about −16 volts −15V during image acquisition is generally sufficient to greatly reduce or completely eliminate FET leakage in the pixel array panel.

Method 400 also includes performing image acquisition through the pixel array panel, at block 406. In some implementations, the image acquisition is performed in response to an increased $V_{off}$ bias on one of the scan lines of the pixel array and the image acquisition is performed shortly after increasing the bias of the $V_{off}$.

Method 400 also includes biasing the FETs in the pixel array panel with a third negative voltage, the third negative voltage being lower than the second negative voltage, at block 408. At block 408, $V_{off}$ of the pixel array biased at a third voltage level that is less in comparison to the $V_{off}$ bias at the second negative voltage level. For example, in some implementations the third negative voltage is the same as the first negative voltage in which case $V_{off}$ is biased by a range of between −2V to −6V and in particular by about 4V lower than a level of the range of about −14 volts to about −16 volts, and in particular −15V that used during image acquisition of the X-ray detector to a bias in the range of about −10 volts to about −12 volts, and in particular −11V that is used during the threshold state. Biasing $V_{off}$ to within the range of about −10 volts to about −12 volts, and in particular about −11V after image acquisition is usually sufficient to scrub the pixel array panel.

In some implementations, methods 200, 300 and 400 are implemented in programmable devices as a collection of cooperating finite state machines. In other implementations, methods 200, 300 and 400 are implemented as a sequence of instructions which, when executed by a processor such as a microprocessor, cause the processor to perform the respective method. In other implementations, methods 200, 300 and 400 are implemented as a computer-accessible medium having executable instructions capable of directing a processor to perform the respective method. In varying implementations, the medium is a magnetic medium, an electronic medium, or an optical medium.

Figure 5:
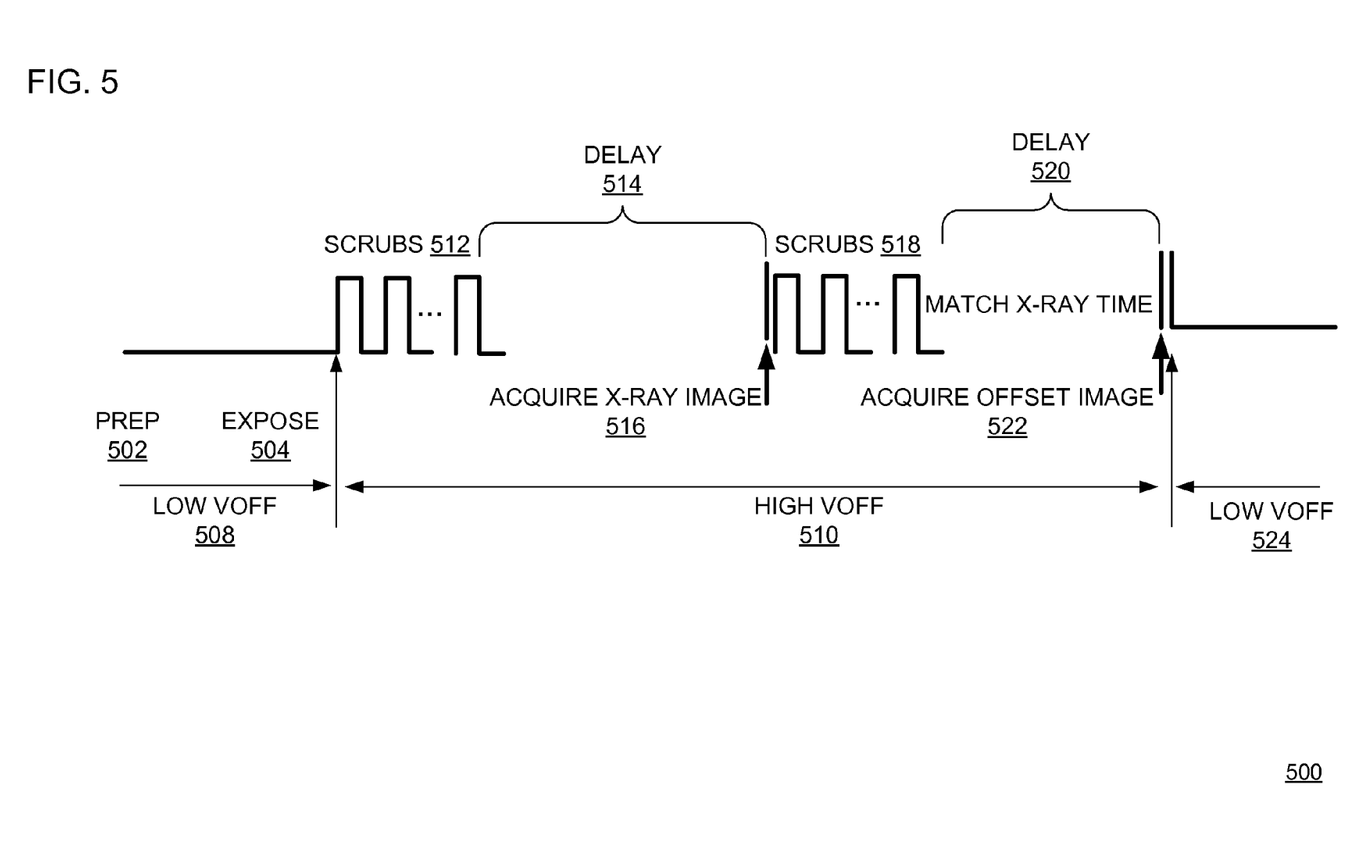
FIG. 5 is a diagram of a timeline to prevent FET leakage in a solid state detector, according to an implementation.

FIG. 5 is a diagram of a timeline 500 to prevent FET leakage in a solid state detector, according to an implementation. In timeline 500, $V_{off}$ is set high only during image acquisition and $V_{off}$ is set low when not imaging.

In timeline 500, before an operator of the solid state detector engages a button for "preparation" 502 and then engages a button to begin "exposure" 504, if the $V_{off}$ is not set to a low setting 508, such as a range of about −10 volts to about −12 volts, and in particular −11V, then the $V_{off}$ is set to the low setting 508.

After the operator of the solid state detector engages the button for "preparation" 502 and then engages the button to begin "exposure" 504, the $V_{off}$ is set to a high setting 510 and a number of scrub operations 512 are performed on the pixel array.

After the scrub operations are complete, and after completion of a timing delay 514 for X-ray, image acquisition 516 begins. After image acquisition is complete, a number of scrub operations 518 are performed on the pixel array.

After the second set of scrub operations 518 and after completion of a timing delay 520 have a same time delay as timing delay 514, an offset image acquisition 522 begins.

After acquisition of an offset image 522, the $V_{off}$ is set to the low setting 524.

The following description provides an overview of computer hardware and a suitable computing environment in conjunction with which some implementations can be implemented. Implementations are described in terms of a processor executing computer-executable instructions. However, some implementations can be implemented entirely in microprocessor hardware in which computer-executable instructions are implemented in read-only memory. Some implementations can also be implemented in client/server computing environments where remote devices that perform tasks are linked through a communications network. Program modules can be located in both local and remote memory storage devices in a distributed computing environment.

Processors are commercially available from Intel, Motorola, Cyrix and others. The processor can be coupled through a bus to random-access memory (RAM), read-only memory (ROM), one or more mass storage devices. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor executes computer programs stored on a computer-accessible media.

The processor can also execute an operating system that is stored on a computer-accessible media, the RAM, the ROM, and/or the mass storage device. Examples of operating systems include Microsoft Windows®, Apple MacOS®, Linux®, UNIX®. Examples are not limited to any particular operating system, however, and the construction and use of such operating systems are well known within the art.

Apparatus components of FIG. 1 and the methods in FIGS. 2, 3 and 4 can be implemented as processor hardware circuitry, as a computer-readable program, as programmable hardware (such as a field programmable gate array (FPGA)), as dedicated, inflexible hardware, or any combination thereof. In another implementation, the apparatus and methods are implemented in an application service provider (ASP) system.

More specifically, in a computer-readable program implementation, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one processor, or on at least as many processors as there are components.

Implementation

FIG. 6 is a block diagram of a portable X-ray detector 600 having a voltage determiner that greatly reduces FET leakage, according to an implementation. In portable X-ray detector 600 includes an external connection point 602 that may be a wireless or wired connection. The external connection point 602 is operably coupled to control electronics 604. The control electronics 604 that includes a voltage determiner 108. The voltage determiner is operable to perform actions 202 and 206 in FIG. 2 and actions 402, 404 and 408 in FIG. 4. The control electronics 604 are operably coupled to a detector 606.

CONCLUSION

Systems, methods and apparatus of preventing FET leakage in a solid state detector, such as a digital X-ray detector or a light detector are described. A technical effect of the systems, method and apparatus is the reduced FET leakage during image acquisition from the solid state detector. Although specific implementations have been illustrated and described herein, it will be appreciated by those of ordinary skill in the art that any arrangement which is calculated to achieve the same purpose may be substituted for the specific implementations shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future communication devices, different file systems, and new data types.

The terminology used in this application is meant to include all solid state detector and FET environments and alternate technologies which provide the same functionality as described herein.

We claim:

1. A computer-accessible medium having executable instructions capable of directing a processor to perform:
    biasing a plurality of field-effect-transistors in a pixel array panel with a first negative voltage;
    biasing the plurality of field-effect-transistors in the pixel array panel with a second negative voltage, the second negative voltage being more negative than the first negative voltage;
    performing image acquisition through the pixel array panel; and
    biasing the plurality of field-effect-transistors in the pixel array panel with the first negative voltage.

2. The computer-accessible medium of claim 1, wherein the first negative voltage further comprises:
    a threshold voltage level.

3. The computer-accessible medium of claim 1, wherein the third biasing action is performed immediately after the image acquisition.

4. The computer-accessible medium of claim 1, wherein the second negative voltage further comprises:
    an active image-acquisition voltage.

5. The computer-accessible medium of claim 1, wherein the second negative voltage being at a level that about closes off a conductive channel in the field-effect-transistors.

6. The computer-accessible medium of claim 1, wherein the image acquisition is performed shortly after biasing the plurality of field-effect-transistors in the pixel array panel with the second negative voltage.

7. The computer-accessible medium of claim 1, wherein the image acquisition further comprises:
    performing a first plurality of electronic scrubbing operations on the pixel array panel;
    acquiring an X-ray image after a first delay of a time period;
    performing a second plurality of electronic scrubbing operations on the pixel array panel; and
    acquiring an offset X-ray image after a second delay of the time period.

8. A method comprising:
    increasing a negative voltage to a pixel array panel from a threshold value;
    performing image acquisition through the pixel array panel; and
    decreasing the negative voltage to the pixel array panel to the threshold value.

9. The method of claim 8, wherein increasing the negative voltage further comprises:
    increasing the negative voltage to an active image-acquisition voltage.

10. The method of claim 8, wherein increasing the negative voltage further comprises:
    increasing the negative voltage to a level that about closes off a conductive channel in the field-effect-transistors.

11. The method of claim 8, wherein decreasing the negative voltage further comprises:
    decreasing the negative voltage in comparison to a threshold voltage level.

12. The method of claim 8, wherein decreasing the negative voltage further comprises:
    decreasing the negative voltage immediately after the image acquisition.

13. The method of claim 8, wherein decreasing the negative voltage further comprises:
    decreasing the negative voltage at a timing that minimizes instability in the field-effect-transistors of the pixel array panel.

14. The method of claim 8, wherein the image acquisition is performed shortly after the increasing of the negative voltage.

15. The method of claim 8, wherein the image acquisition further comprises:
    performing a first plurality of electronic scrubbing operations on the pixel array panel;
    acquiring an X-ray image after a delay of a time period;
    performing a second plurality of electronic scrubbing operations on the pixel array panel; and
    acquiring an offset X-ray image after a delay of the time period.

16. A system to reduce field-effect-transistor leakage in a digital X-ray detector comprising:
    a processor;
    a digital X-ray detector coupled to the processor; and
    apparatus operable on the processor operable to:
        set a negative voltage of the digital X-ray detector to a negative voltage that is higher than a threshold negative voltage;
        acquire an image through the digital X-ray detector;
        acquire an offset image through the digital X-ray detector; and
        set a negative voltage of the digital X-ray detector to the threshold negative voltage.

17. The system of claim 16, wherein the apparatus that is operable to set a negative voltage of the digital X-ray detector to a negative voltage that is higher than a threshold negative voltage further comprises apparatus that is operable to set a negative voltage of the digital X-ray detector to a negative voltage at a level that about closes off a conductive channel in field-effect-transistors of the digital X-ray detector.

18. A solid state detector for use in detecting electromagnetic energy, the solid state detector comprising:
    a substrate;
    a panel array of field-effect transistors and photodiodes arranged in a plurality of rows positioned above the substrate;
    a scintillator positioned above the panel array of field-effect transistors and photodiodes;
    readout electronics coupled to each of the field effect transistors in the panel array;
    at least one digital output coupled to the readout electronics; and
    apparatus operable to:
        bias a negative voltage of the panel array to a negative voltage that is higher than a threshold negative voltage; and
        acquire an image through the panel array.

19. The solid state detector of claim 18, wherein the apparatus is further operable to:
    perform a first plurality of electronic scrubbing operations on the panel array;
    acquire an X-ray image after a delay of a time period;
    perform a second plurality of electronic scrubbing operations on the panel array; and
    acquire an offset X-ray image after a delay of the time period.

20. The solid state detector of claim 18, wherein the apparatus is further operable to:
    bias the negative voltage of the panel array to the threshold negative voltage.

* * * * *